US010083112B2

(12) United States Patent
Cochran et al.

(10) Patent No.: US 10,083,112 B2
(45) Date of Patent: Sep. 25, 2018

(54) PRODUCTION-LIKE TESTING AND COMPLEX BUSINESS TO BUSINESS AUDITING SYSTEM

(71) Applicant: Global Healthcare Exchange, LLC, Louisville, CO (US)

(72) Inventors: Steve Cochran, Niwot, CO (US); Hatem El-Sebaaly, Houston, TX (US); Eric Bersagel, Fort Collins, CO (US); Mukund Jaiswal, Lafayette, CO (US); Daniel Milburn, Erie, CO (US)

(73) Assignee: GLOBAL HEALTHCARE EXCHANGE, LLC, Louisville, CO (US)

( * ) Notice: Subject to any disclaimer, the term of this patent is extended or adjusted under 35 U.S.C. 154(b) by 65 days.

(21) Appl. No.: 15/377,843

(22) Filed: Dec. 13, 2016

(65) Prior Publication Data

US 2018/0165184 A1   Jun. 14, 2018

(51) Int. Cl.
*G06F 11/00* (2006.01)
*G06F 11/36* (2006.01)
*G06Q 10/10* (2012.01)

(52) U.S. Cl.
CPC ...... *G06F 11/3688* (2013.01); *G06F 11/3664* (2013.01); *G06F 11/3692* (2013.01); *G06Q 10/10* (2013.01)

(58) Field of Classification Search
USPC ...................................................... 714/38.1
See application file for complete search history.

(56) References Cited

U.S. PATENT DOCUMENTS

| | | | | |
|---|---|---|---|---|
| 2003/0233551 | A1* | 12/2003 | Kouznetsov | G06F 17/30209 713/175 |
| 2012/0072764 | A1* | 3/2012 | Narin | H04L 41/0604 714/2 |
| 2012/0246515 | A1* | 9/2012 | Lusenhop | G06F 11/3672 714/32 |
| 2014/0033123 | A1 | 1/2014 | Hockmann | |
| 2016/0098340 | A1* | 4/2016 | Weaver | G06F 21/55 714/38.1 |

OTHER PUBLICATIONS

International Search Report and Written Opinion dated Jan. 8, 2018 in Application No. PCT/US2017/56219.

* cited by examiner

*Primary Examiner* — Sarai E Butler
(74) *Attorney, Agent, or Firm* — Snell & Wilmer, L.L.P.

(57) ABSTRACT

A system of testing updated software may include a cloud-based production environment. The system may also include a cloud-based testing environment. The system may also include a cloud-based production processing unit configured to receive in response to document, execute an initial software by inputting the document, and determine an initial software result and an initial software process based the document. The system may also include a cloud-based testing processing unit configured to receive the document, execute an updated software by inputting the document, and determine an updated software result and an updated software process based on the document. The system may also include a testing comparison unit configured to compare the initial software result and the updated software result, and compare the initial software process and the updated software process.

20 Claims, 12 Drawing Sheets

PRODUCTION-LIKE TESTING AND COMPLEX BUSINESS TO BUSINESS AUDITING SYSTEM

FIELD

The present disclosure generally relates to a data processing optimization system. More particularly, the disclosure includes a system and method of dynamically and scalably storing, communicating and retrieving large amounts of data.

BACKGROUND

Conventional document routing systems may not be optimized for business-to-business transactions. In particular, the systems may not be able to process the volume of documents that may be applied in a business-to-business context. Conventional systems are not only expensive, but the conventional systems also are not sufficiently fast and do not sufficiently scale.

SUMMARY

A system of testing updated software is also disclosed. In various embodiments, the system includes a cloud-based production environment. In various embodiments, the system also includes a cloud-based testing environment. In various embodiments, the system also includes a cloud-based production processing unit configured to receive a document, execute an initial software in the cloud-based production environment by inputting the document in the cloud-based production environment, and determine an initial software result and an initial software process based the document. In various embodiments, the system also includes a cloud-based testing processing unit configured to receive the document, execute an updated software in the cloud-based testing environment by inputting the document in the cloud-based testing environment, and determine an updated software result and an updated software process based on the document. In various embodiments, the system also includes a testing comparison unit configured to compare the initial software result and the updated software result, and compare the initial software process and the updated software process.

In various embodiments, the document is associated with a client and a vendor. In various embodiments, the document comprises a plurality of documents associated with the client and the vendor. In various embodiments, the plurality of documents associated with the client and the vendor are further associated with a time range. In various embodiments, the document comprises a plurality of documents having a document type. In various embodiments, a configuration of the cloud-based production environment is identical to a configuration of the cloud-based testing environment. In various embodiments, the system further includes a display configured to display the comparison of the initial software result and the updated software result and the comparison of the initial software process and the updated software process. In various embodiments, the document is a document being processed in a non-testing situation by an end user.

A method of testing updated software is also disclosed. In various embodiments, the method includes constructing a cloud-based production environment; constructing a cloud-based testing environment; executing an initial software in the cloud-based production environment by inputting a document; determining an initial software result and an initial software process based on executing the initial software with the document; executing the updated software in the cloud-based testing environment by inputting the document; determining an updated software result and an updated software process based on executing the updated software with the document; comparing the initial software result and the updated software result; and comparing the initial software process and the updated software process. In various embodiments, the method further includes displaying, by a display, the comparison of the initial software result and the updated software result and the comparison of the initial software process and the updated software process.

A cloud-based testing system for testing updated software is also disclosed. In various embodiments, the system includes a cloud-based testing processing unit configured to receive a document, execute an updated software in the cloud-based testing environment by inputting the document in the cloud-based testing environment, and determine an updated software result and an updated software process based on the document. In various embodiments, the system also includes a testing comparison unit configured to compare the updated software result with an initial software result received from a cloud-based production processing unit based on executing initial software in a cloud-based production environment by inputting the document, and compare the updated software process with an initial software process received from the cloud-based production processing unit based on executing the initial software in the cloud-based production environment by inputting the document.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

A more complete understanding of the present disclosure may best be obtained by referring to the detailed description and claims when considered in connection with the figures, wherein like numerals denote like elements.

DETAILED DESCRIPTION

Figure 1:
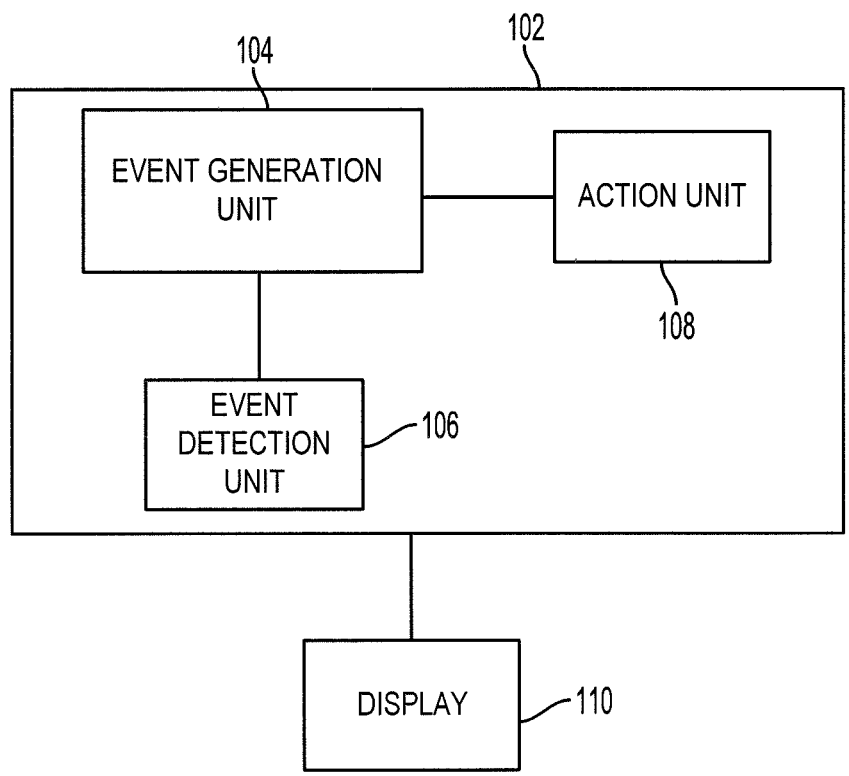
FIG. 1 illustrates a block diagram of the highly scalable event brokering and audit traceability system, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented. Furthermore, any reference to singular may include plural embodiments, and any reference to more than one component or step may include a singular embodiment or step. It is to be understood that reference to an item in the singular may also include the item in the plural, and plural may include singular. All ranges and ratio limits disclosed herein may be combined.

The present disclosure is described in one or more embodiments in the following description with reference to the figures, in which like numerals represent the same or similar elements. While the disclosure is described in terms of the best mode for achieving the disclosure's objectives, it will be appreciated by those skilled in the art that it is intended to cover alternatives, modifications, and equivalents as may be included within the spirit and scope of the disclosure as defined by the appended claims and their equivalents as supported by the following disclosure and drawings.

Highly Scalable Event Brokering and Audit Traceability System

The highly scalable event brokering and audit traceability system may include any supply chain collaboration system where documents are exchanged. In various embodiments, the system may be described as a business-to-business supply chain with business documents. The business documents may include purchase orders, invoices, advance shipped notices, and/or catalogs, for example. The system may serve as a facilitator between a client and a vendor.

In various embodiments, the system is a scalable event-driven architecture utilizing a single vendor to multiple clients model and providing event history and replay. The system processes documents via an event-driven architecture. Events represent the state of a document as a system component processes the document. Events may also represent a significant occurrence, such as an organizational change or system notification. All of the events associated with a document, from being received by the system to a communication to a party, may be classified as an event flow.

A user, through a user interface, may search for an event flow based on status of the flow (e.g., document sent, or in-progress), based on data within the document itself or based on metadata about the document as a result of a component processing the document. Once searched, the user can see document metadata and additionally drill-down to retrieve the actual physical document.

Thus, the complete history of how a document was processed to get the document from one processing unit to the next is stored, easily searchable and allows for retrying failed processing. The entire flow or any portion thereof may be restarted.

Clients may communicate business documents (e.g., purchase orders) to the system, wherein the business documents may have one or more errors. The purchase orders may not have the correct item, the correct address, or the correct recipient, for example. In response to the purchase order not having the correct information, the vendor may not be able to execute the purchase order.

For example, the purchase order may include account number data associated with an account number. The account number may be mapped into a billing address or a shipping address. In many situations, clients (e.g., hospitals) have a hierarchical structure. That is, a particular client may have a headquarters at a first location and may have facilities at a second location. Accordingly, the ordered goods should be shipped to the facilities, and not to the headquarters. Similarly, the bill or invoice should be sent to the headquarters, and not the facility. Significant problems may arise when the first location and the second location are misidentified.

Conventionally, the client or the vendor may use account numbers to represent the other party. The account numbers may be associated with the relevant data, such as addresses. However, the client and the vendor having different account numbers and internal reference identifiers for products may create confusion. For example, if the client submits a purchase order using the client's internal reference identifier for the particular good, the vendor may not be able to identify the particular good, as the vendor may not be aware of which product is associated with the client's internal reference identifier. The client's internal reference identifier may also not provide an indication of the good in any way. For example, the client may internally identify a box of latex gloves as BW36. However, the internal identifier, if accidentally used, may not be useful to the vendor if the vendor identifies the box of latex gloves as latexgloves023. In addition, BW36 may not signify to the vendor that it is associated with latex gloves.

FIG. 1 illustrates a block diagram of an embodiment of the highly scalable event brokering and audit traceability system. The system includes an engine 102, which includes an event generation unit 104, an event detection unit 106, and an action unit 108. The system also includes a display 110.

Figure 2:
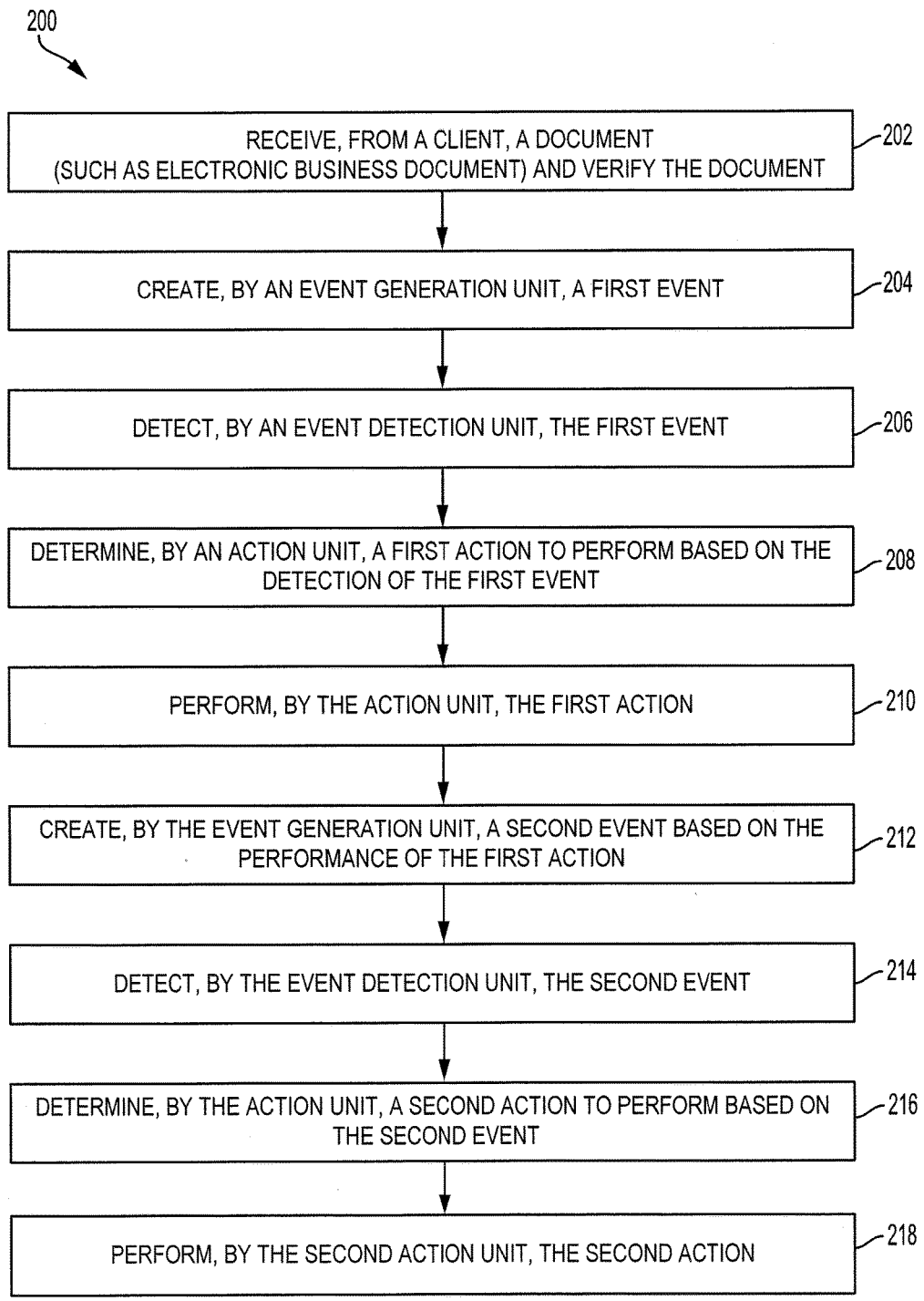
FIG. 2 is a flowchart illustrating the process used by the highly scalable event brokering and audit traceability system, in accordance with various embodiments.

FIG. 2 illustrates a flowchart illustrating the process 200 used by the highly scalable event brokering and audit traceability system. The engine 102 receives, from a client, a document, such as an electronic business document (e.g., a purchase order, business document invoice, advanced ship notice) (step 202). The system analyzes the document and automatically interprets the document based on the internal reference numbers of the client and/or the vendor. The document may be made up of multiple documents, and the system is configured to split up the documents into multiple documents. The system is configured to handle the large amount of processing demands associated with the interpreting of the documents. The client and/or the vendor may identify to the system their internal identifiers for goods and other parties. In this way, the system allows the client and the vendor to only keep track of their respective identifiers. In various embodiments, the client data used to identify the client internal identifiers for goods and services is initially provided by the client, to the system, and is updated periodically. In various embodiments, the vendor data used to identify the vendor internal identifiers for goods and services is initially provided by the vendor, and is updated periodically. In various embodiments, the client data and/or the vendor data is updated on a daily, weekly, monthly, or yearly basis, and the updating period may be different for various clients and various vendors.

The system may use cloud computing to scale the facilitation of purchases. The system scales elastically, on-demand. That is, the virtual computing resources will grow, and will grow until a cloud computing limit is reached. The virtual computing resources may grow based on a configurable setting for an algorithm provided by a vendor of the cloud computing resources by monitoring vital computer resources.

In response to the system receiving a document (e.g., a purchase order) from the client, the document is verified (step 202). However, the document may be secure, encrypted and digitally signed. As such, verifying a signature and decrypting the document may occupy significant computational resources. In response to the system receiving the document, the system replies to the client that it was received, that it is in possession of the system, and that the signature is verified. The signature may be verified using a de facto crypto digital signature verification algorithm, such as Secure/Multipurpose Internet Mail Extensions (S/MIME). The document is stored in a document database of the system and a first event, such as a structure verification event, is generated by the event generation unit 104 (step 204).

The event detection unit 106 detects the first event (step 206). In various embodiments, the first event is a signature verification event. In various embodiments, the event generation unit 104 communicates an indication to the event detection unit 106, when the first event is generated. In various embodiments, the event detection unit 106 monitors outputs of the event generation unit 104 to detect when the first event is generated. The action unit 108 determines a first action to perform based on the detection of the first event (step 208). In various embodiments, the action unit 108 determines a first action of verifying the purchase order. The action unit 108 performs the first action (step 210). In various embodiments, the system verifies the structure of the document. Once the structure of the document is verified, another event is generated. The structure of the document may be verified based on configurable metadata that defines the structure of the document once recognized. The next event may know when a prior event is completed by an event consumer durably marking the event as being completed. There may be more than one event consumer durably marking respective statuses. As one unit completes a task and hands off to another unit, a work event is generated (step 212). The event detection unit 106 detects the second event (step 214) and the action unit 108 determines a second action to perform based on the second event (step 216) and the action is performed by the action unit (step 218). The system may cluster the events to segregate the events based on time and name results for a more efficient system.

In various embodiments, the action unit 108 is a collection of units configured to perform individual actions, such as verification of the document and generation of documents. In response to the event being created, it automatically triggers an action from another unit within the action unit 108 and the event is also recorded. The action from the another unit may be triggered by a notification being written to durable storage and a notification being communicated to registered event listeners. The event may simultaneously be a trigger for action and a historical data structure. Many listeners may be associated with the event and the many listeners may be notified when the event is completed. Once the multiple listeners are notified, the multiple listeners may individually perform respective processing procedures, resulting in parallel processing. The parallel processing may result in significant efficiency gains. The system may combine the triggering and recording results in reading and writing processing improvements as a single command, instead of executing in two commands. In response to two commands being processed, the database may experience bottlenecking, as units may be communicating read and write operations simultaneously.

In addition, sharding or clustering based on the event may be executed, in order to further improve processing times. As a result, a first engine may not fully or partially compete with another engine on the same cluster, on the same block of events. Accordingly, the system is more efficient and more scalable. As the scale increases, more engines may be elastically added and more shards may be created. The additional engines may be added based on a configurable setting of the cloud resource provider. The additional shards may also be created based on a configurable setting of the cloud resource provider.

The system is highly scalable. The event broker is scalable both from its compute layer and its persistence layer. For the compute layer, the event broker is a client-side API able to run in the Cloud and thus scale as more compute resources are added. A central master broker may not be included. Events may be dispatched in memory or if listeners are busy, events may be stored to a database for other instances of those slow listeners to process, and thus scale. In addition to horizontal scalability, real-time configuration of client-side listeners that dispatch settings allows for vertical scalability.

Figure 3:
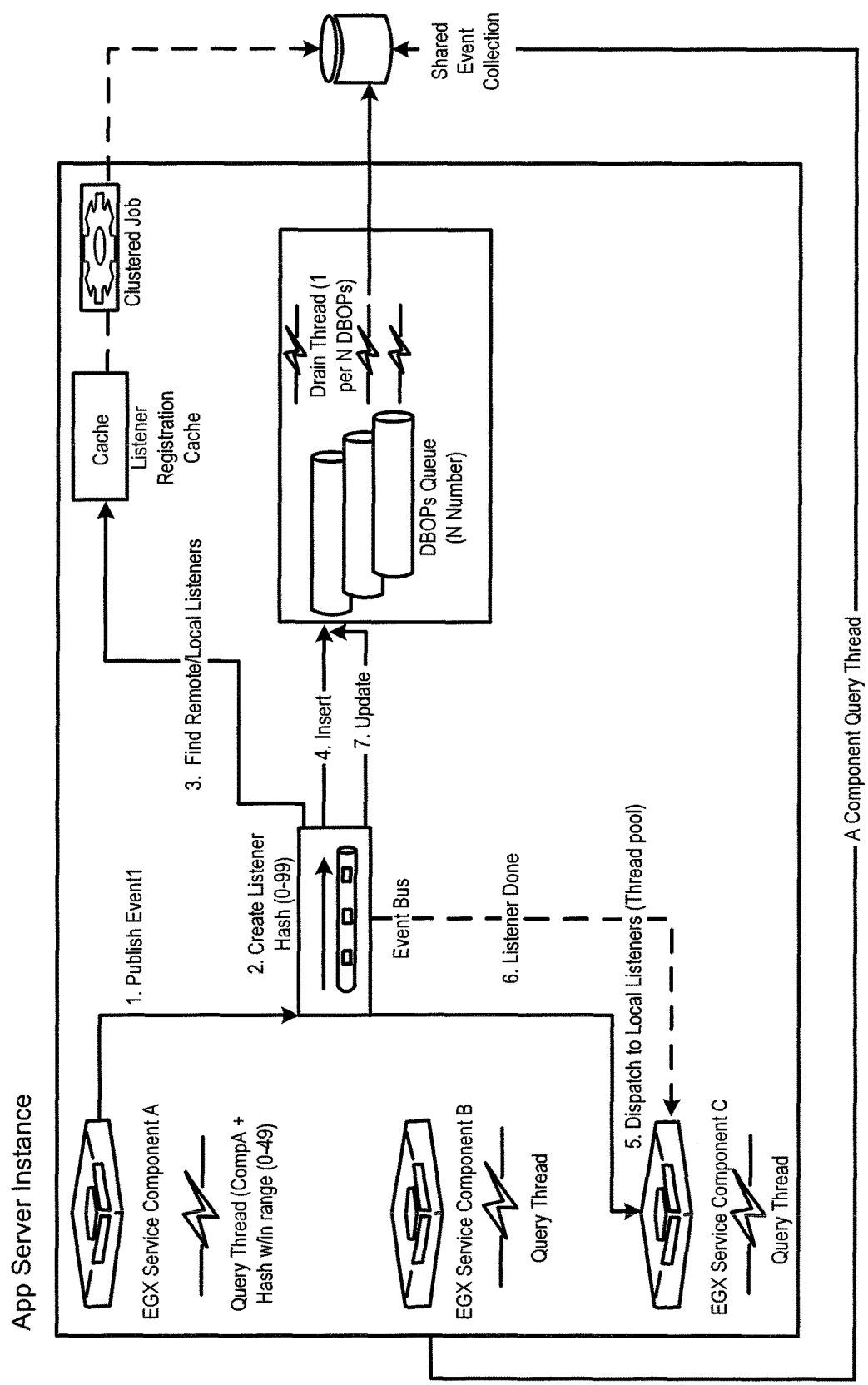
FIG. 3 illustrates rebalancing of listener instances based on component health collections and allocation of listener hash range for each listener instance, in accordance with various embodiments.

For the persistence layer, the event-broker stores events (e.g., document metadata, organization changes, or notifications) in a sharded database cluster. Each event may have a listener hash, which is used as the shard key. Given the nature of the partition/hash, the database may be pre-assigned shard chunks on each shard node. New shards may be added as the event broker starts generating new events based on a configuration parameter with an increased listener hash range. For example, if the system has five shard clusters and the partition/hash is 0-99, then each shard node may hold a range of 20. Adding a new shard may simply entail expanding the partition/hash to 0-119 and pre-allocating 100-119 to the new shard. The rebalancing of listener instances based on component health collections and allocation of listener hash range for each listener instance is illustrated in FIG. 3.

High-speed event processing may be achieved in a number of ways. High-speed event processing may be achieved by the listeners being vertically scaled. Each event broker listener can have a configurable number of dispatcher threads/queue. High-speed event processing may be achieved by the broker being client-side and configured to be horizontally scaled. High-speed event processing may be achieved by multiple listeners for any given event running in parallel and guaranteeing that only one instance of any specific listeners receives the event. High-speed event processing may be achieved by database batching. In database batching, database operations are batch/bulk sent to the data layer. The database operations as part of batching are incorporated together. As a result, for any given event, if there is an insert and two updates, these can be incorporated into a single insert command to the database.

The system may combine three structures—the event, the command, and the audit—and stores them. Instead of processing each event and command in the unit section, the system prepares them in a way that they can be stored in bulk, and created in bulk. The memory is brought up so that a higher throughput may be achieved. Increases in throughput may be on the order of a thousand times. Searching may be performed more efficiently as well.

Particular documents may be identified and processed at a higher priority than other documents. Metadata structures may be used to identify the documents with higher priority, so that they are processed faster than others with lower priority.

By processing the three structures at the same time or similar times, larger amounts of data may be processed and computing resources may be preserved. In various embodiments, the system is able to process 25 million documents when conventional systems are unable to process even 500,000 documents.

The efficient storage, the efficient retrieval, and efficient caching provides for the increase in processing speed. In order to achieve scalability, the brokering subsystem is not tied to a master. As a result of the clustering, every structure is independent. Accordingly, load is distributed across the various subcomponents at the lowest level.

Registered component listeners may have events dispatched to it either in-memory or via a query mechanism. An event is dispatched in-memory if that component is running on the same virtual machine as the event producer and the component listener has free thread/queue slots to accept the event. An event may also be marked as "pending" for a component listener allowing an instance on another virtual machine (or the same virtual machine) to query for the event in response to the listener being able to process it.

In response to a listener being slow, the event bus performs query dispatch, aiding in scalability. This allows new compute resources to come online and perform processing. In addition, an in-memory model is able to achieve high performance. Further, listener components may run all together or run in their own compute servers, resulting in very flexible design.

Each event may be assigned a unique component listener partition or hash number. This partition or hash may be a simple random number 0-N. A component listener may have N active listeners each running on different servers. An event can only be processed by one and only one instance of any given listener.

In-memory dispatches may not utilize the listener hash. However, for query consumption, the listener hash is used to reduce contention at the database level. Instances of a component listener are constantly rebalanced so that there is always one and only one component listener assigned to process a range of listener hashes. Listener hash also allows grouping or partitioning of the events to provide some minor ordering or grouping guarantees in various parts of the event bus. Multiple listeners for any given event may be running in parallel while guaranteeing that only one instance of any specific listeners receives the event.

For example, the system may perform 10 different sub-processes A-J to process the document. The sub-processes may include, for example, verifying a signature of the document, decrypting the document, identifying the format of the document, enriching the document, and/or identifying contents and values within the document. Each of the 10 different sub-processes may be associated with a unique listener, which may trigger execution of the respective sub-process. Therefore, each of the 10 different sub-processes may be executed in parallel, as each sub-process is triggered by its respective listener. In this way, one sub-process may not wait for another sub-process to be completed, and the system may be scaled, increasing efficiency.

Conventionally, in a common queuing system or an event sourcing system, system performance may depend on the queue, and visibility may be limited to the term of queue information. However, in the system, all of these things are visible to the end user, and the user can see exactly what's going on within the event brokering system in a way that is efficient and does not interfere with the processing phase. This is unlike other systems which may effectively be a black box. The system event bus allows the following visibility for any published event.

In particular, which components are going to receive the event when they are ready to process the event, which components are actively processing the event, and which components finished processing the event may be visible. In addition, the event bus also provides seeing real-time processing metrics, event backlog (which events are assigned but not dispatched), slow component listener (see listeners that have events assigned to it but the component is backlogged and is behind), and metrics into all internal queues, threads and processing times to aid in diagnosing bottlenecks or issues.

Message brokering, which is not established for business to business situations, is provided by the system.

The system includes a generic event bus with the ability to send any type of event. On top of the event bus, a document audit tracking subsystem moves events related to transacting a document between trading partners into another set of document meta-data collections.

Document audit tracking provides grouping of events for a single document into an event flow, calculating the status of document processing based on the current work performed, partial or complete visibility into each processed event (i.e., a document lifecycle), and an ability to replay events back into the event bus for re-processing by listeners, allowing for resuming of failed document processing. The visibility into each processed event includes retrieving the actual document that is in various stages through the lifecycle from the physical document storage engine. The document audit tracker works in an eventually-consistent paradigm, as it will eventually move data into its database collections.

As a document is processed, the document audit tracking subsystem may record, in the document meta-data collections, each event that is created during the processing of the document. For example, when the document is received, a document received record may be recorded, when the document is verified, a document verification record may be recorded, and when the document is processed, a document process record may be recorded. A user of the system may be able to access a progress of the document through processing using the document audit tracking subsystem. The system may request, from the document audit tracking subsystem, a progress of a particular document, and the document audit tracking subsystem may access the document meta-data collections to determine a progress of the document.

In an example process, the received document may be associated with a particular set of meta-data associated with the document, the sender, and/or the receiver. As the document is processed by the system, each record recorded by the system may also be associated with the same particular set of meta-data, such that the document progress may be tracked.

The system also includes the ability to dynamically configure and add an event listener in order to change the workflow.

The system business to business exchanges allow monitoring of any event and performing monitoring or alerting actions (e.g., send page, send email). The system business to business exchanges also allow visibility into dead or stalled components. The events held by these stalled or dead listeners can be released for another instance of that component to pick it up and process. From the business level, documents can be restarted based on various business rules or the document processing can be paused.

Figure 4:
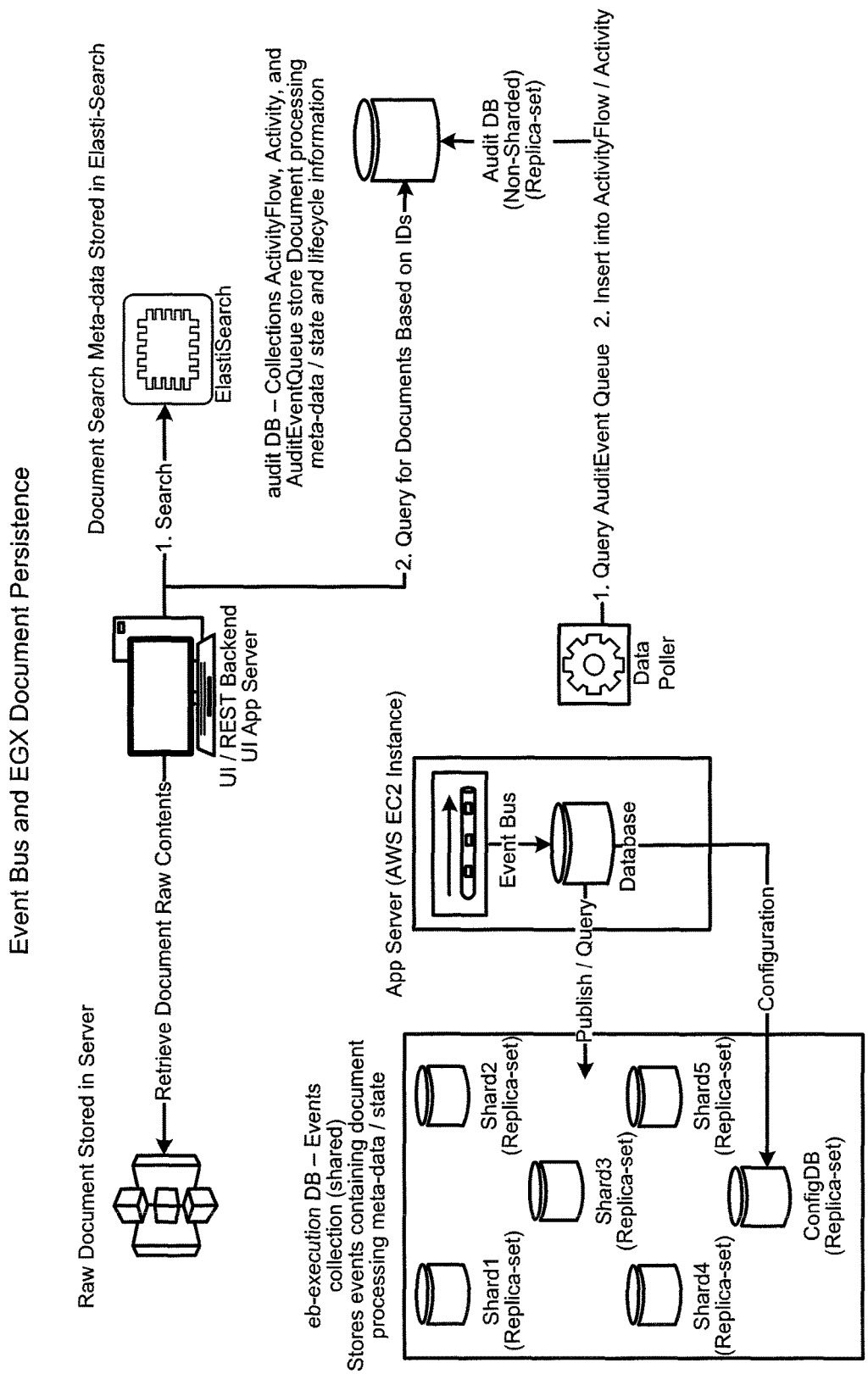
FIG. 4 illustrates efficient document storage by the system, in accordance with various embodiments.

FIG. 4 illustrates efficient document storage by the system. A document may be very large and highly complex computing may be involved when processing the document. Various system components may interact with the document in various ways depending on the task. To facilitate efficient access to and efficient use of system resources, the document may be stored in three different data formats in high availability data systems. The document is represented in a physical document, document processing metadata, and document search criteria.

Physical documents (which may entail large amounts of data) are stored in a cheap, secure storage engine that provides streaming capability. Document processing metadata may be persistently stored in a high-speed query-able storage engine. The document meta-data contains some or all state information about the processing of the document and provides partial or complete visibility to that processing. Document search criteria may be stored in a high-speed, distributed indexing engine. A document may be associated with hundreds of search terms.

Multi-Factor Routing System for Exchanging Business Transactions

The multi-factor routing system for exchanging business transactions may receive data without a sender and receiver. The system may determine the sender, receiver, protocol, and connection from which it was received. In various embodiments, the system may determine a sender and receiver based on a connection through which the data was communicated. In many situations, the system receives a document, such as a purchase order, with no indication of a recipient of the document. The system analyzes the document to determine the recipient of the document (the vendor). In various embodiments, the vendor is identified using a vendor identifier. In various embodiments, a temporary address of the vendor may be used. In various embodiments, the document may contain nested documents, with different buyers and vendors.

Figure 5:
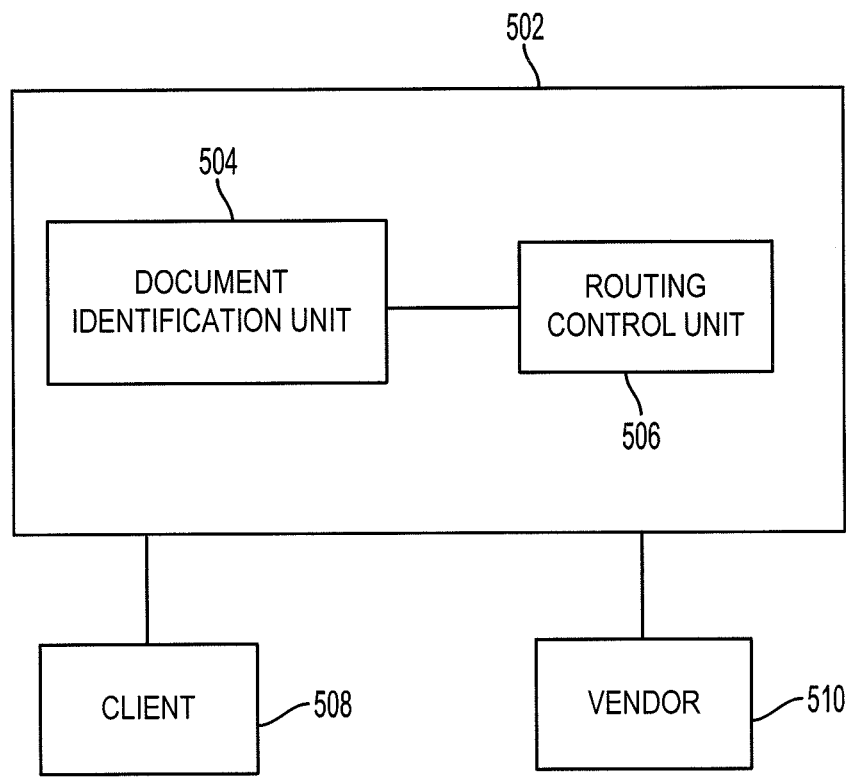
FIG. 5 illustrates a block diagram of the multi-factor routing system for exchanging business transactions, in accordance with various embodiments.

FIG. 5 illustrates a block diagram of the multi-factor routing system for exchanging business transactions. The system includes an engine 502, which includes a document identification unit 504 and a routing control unit 506. The engine 502 is in communication with a client 508 and a vendor 510.

Figure 6:
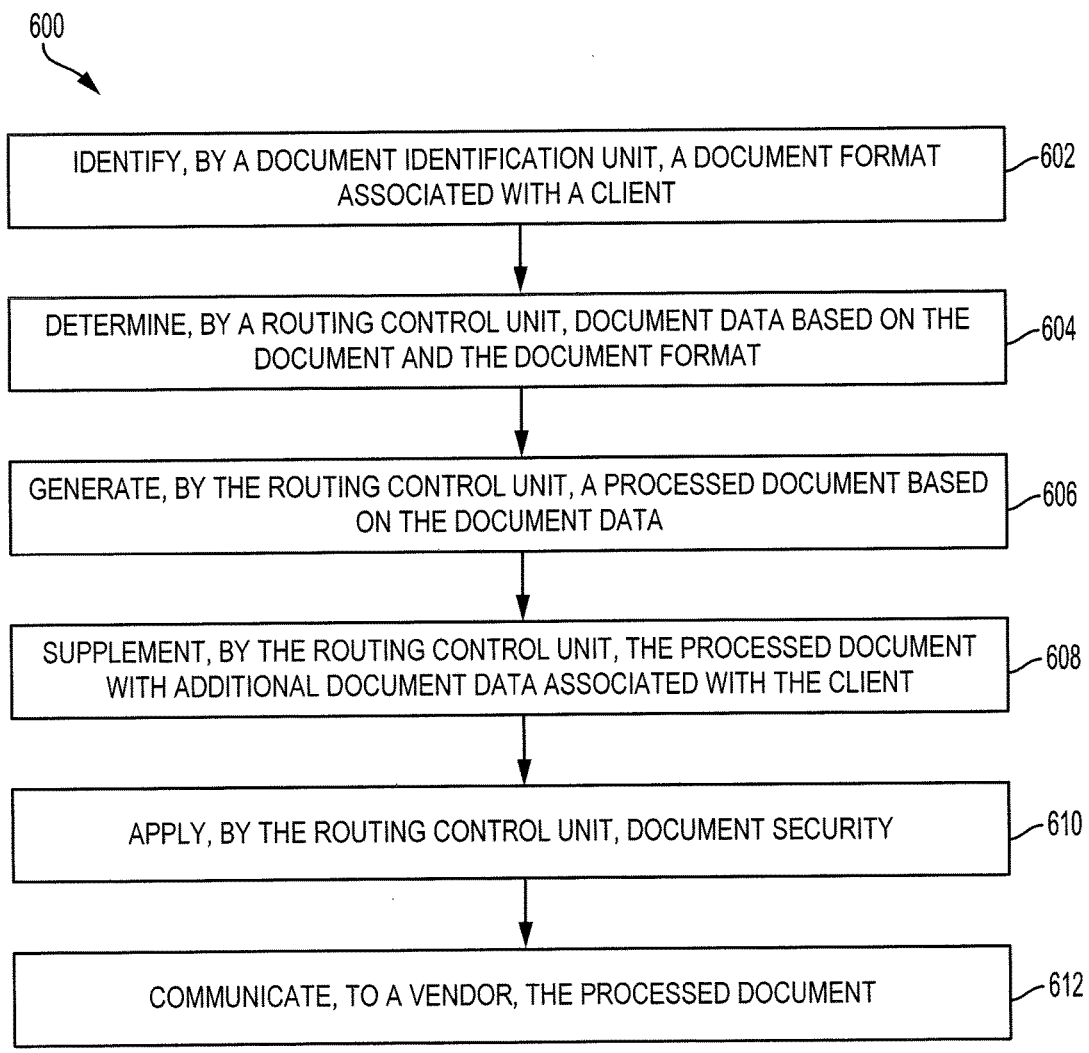
FIG. 6 is a flowchart illustrating the process used by the multi-factor routing system for exchanging business transactions, in accordance with various embodiments.

FIG. 6 illustrates a flowchart illustrating the process 600 used by the multi-factor routing system for exchanging business transactions. A document identification unit 504 receives a document format associated with a client 508 (step 602). The document may be a purchase order or any other document. When the document is a purchase order, the document identification unit 504 may be a purchase order identification unit. The document format may be provided by the client 508. The system does not require a hard-coded document structure. The system may use a metadata-driven structure, or the client may identify where to locate data from the document, such as the sender and receiver. The locations of information from the document may vary from client to client. The document format may indicate where, on a document, particular pieces of data may be located.

A document may be received. The document may be encrypted and signed. The engine 502 may verify the signature and decrypt the document. The engine 502 may raise an event or command to the routing control unit 506.

The routing control unit 506 determines document data based on the document and the document format (step 604). In various embodiments, the document format may indicate where on the document particular data can be found, and the routing control unit 506 determines the document data from the document. In various embodiments, the document format indicates a location in two dimensional space where various pieces of document data may be found on the document. In various embodiments, the document format indicates a word to be searched for, which is associated with various pieces of document data.

The document data may include a document type and subtype, a sender, a receiver, tracking information, and an item identifier associated with the good, product, or service being ordered. The routing control unit 506 may also validate relationships, apply strategies, store routing and tracking contexts, publish visibility, or perform pre-validation actions, such as duplicating the purchase order.

The routing control unit 506 generates a processed document based on the document data (step 606). The processed document may be the document to send to the vendor 510. The routing control unit 506 determines missing data from the document data, and supplements the processed document with additional document data associated with the client (step 608). The additional document data may include billing data, shipping data, pricing data, routing data, communications channel data, and filename data. In various embodiments, supplementing the processed document with additional document data may be applying rules to enrich the document.

Document security may be applied by the routing control unit 506 (step 610). The document security may include encryption. The processed document is communicated to the vendor 510 (step 612).

In various embodiments, the client may be bound by using some standard of some form that may not be recognized by a vendor. The system interprets the form used by the client to communicate to the vendor the document data from the client.

In various embodiments, in response to the system receiving a non-standard form, the system overrides the standard form and uses the non-standard form. Without the system, the non-standard form would be rejected, and time and money would be spent to adjust the client's communication to normalize the data across all clients and vendors.

In various embodiments, various pieces of information may be misplaced on a document. For example, the sender and receiver may be misplaced on a purchase order. The system may analyze the purchase order, and based on a combination of factors, may allow the modification of the end result based on these heuristic rules.

In various embodiments, in response to no sender being identified, the system may determine the sender by tracing a connection by which the document was communicated. The system may determine whether an authentic connection was used, or whether the file is encrypted and signed. In the case the document is signed, the system may determine that whoever signed the document is the sender.

Figure 7:
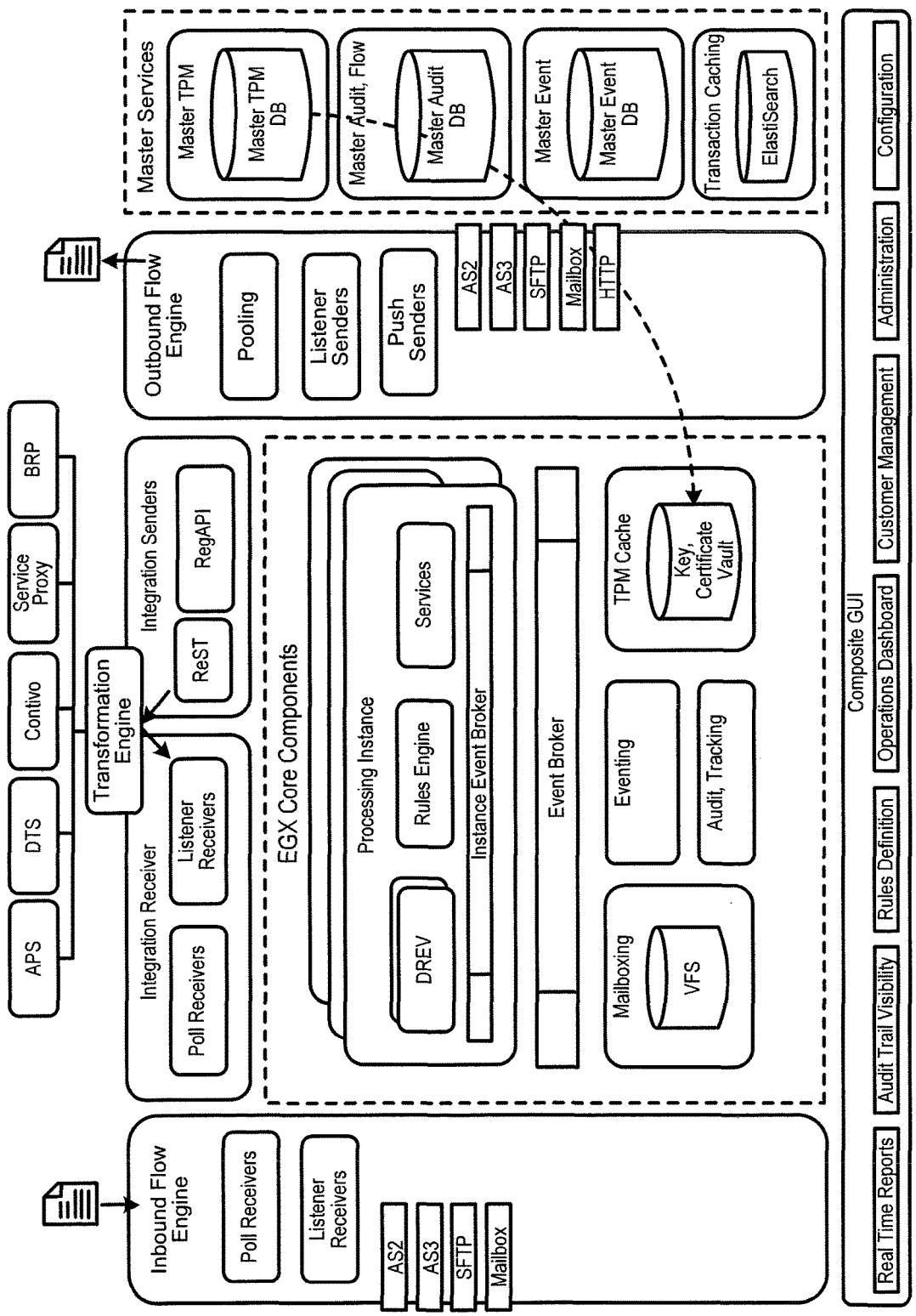
FIG. 7 illustrates an exemplary architecture of the system, in accordance with various embodiments.

The system provides a flexible and scalable business to business document exchange for healthcare and other domains. FIG. 7 illustrates an exemplary architecture of the system. The system combines a set of cloud and non-cloud friendly frameworks and algorithms to properly complete, align and enrich the business transaction. The system may include one or more of a reconfigurable state machine, a community trading partner information hierarchical registry, a sender/receiver set of configurable strategies, a configurable extraction/validation engine, a business rules and transformation engine, a routing rules engine which includes flexible actions, a secure set of communication adapters, and a built-in audit and production like replay feature that helps improve quality.

The system separates the processing compute resources from the operational compute resources in order to achieve real-time interactions as well as to elastically scale. The system uses streaming where applicable for security and storage compute processing. A special scheme is used to tie the non-repudiation audit (track every actions taken) trail from the endpoint system all the way to the receiver, if deployed on both sides.

A special set of audit and quality features supports migration from a different platform onto the system. Business documents can be processed on both systems but remain live (delivered to vendor or client) on one system. The documents are automatically compared on both systems as part of an audit process to ensure no differences exist between the two platforms.

In various embodiments, a client healthcare provider (buyer of goods) sends a purchase order (or batch of them) to the system from their internal systems, destined to a vendor (seller of goods). The client is typically a facility of a larger organization, and the Ship To as well as the Bill To address information can be different. The clients and vendors do not typically have a single source of truth to maintain proper information (e.g., Ship To address, Bill To address, Catalogue Items, Contracted Item Pricing). Conventionally, the client includes a supplier assigned account number which is used to uniquely identify the buyer from the supplier perspective. Unique cases exist where some other combination of buyer specific codes is included in the document instead. The system acts as the single source of truth registry for all partners to properly determine the correct Ship To address, Bill To address, Item information and pricing. This registry is used to adjust the purchase order accordingly and deliver the business document to the seller. Without these adjustments, the ordering process would fail. A similar process takes effect for clients returning business documents (e.g., Purchase Order Acknowledgement, Advanced Ship Notice and Invoices).

In various embodiments, the system may be used in system-to-system data integration between a client system and applications, including synchronization of enriched data back into client systems from solutions such as catalogue and contracting applications. The system provides a flexible and scalable architecture to support high volume of real-time interactions for trading communities. The system includes a framework, which is a high throughput and latency-efficient event sub-system with consumers/consumers/subscribers' components that minimizes the delay for staged event driven architecture business to business platform. The framework is designed to be robust, elastic and to support optimal load distribution among component instances running on the engines. A special structure is used to tie the events and information from the components that performed work in response to these events.

Components receiving documents from remote systems process the received document and raise an event so that other components do the next processing step. The process repeats until a correct business document is delivered to its destination. The event system is the broker of these events. The event system manages to deliver the events to registered components in a loosely coupled fashion.

Leveraging the available features of the event subsystem, the trigger subsystem monitors configurable events and triggers processing logic embedded inside action components. Actions can raise alert messages to be delivered by the alerting subsystem. A special framework is exposed to collect information for use to monitor documents and raise alerts in response to the trends of the exchanged documents violating certain configurable thresholds.

The system may include inbound engine and inbound adapters which can be introduced to the platform in a dynamic fashion. There are two types of inbound adapters: listener and puller. The listener component waits for connections from remote systems and accepts secure documents. The puller connects to the remote system and retrieves the document into the system.

Figure 8:
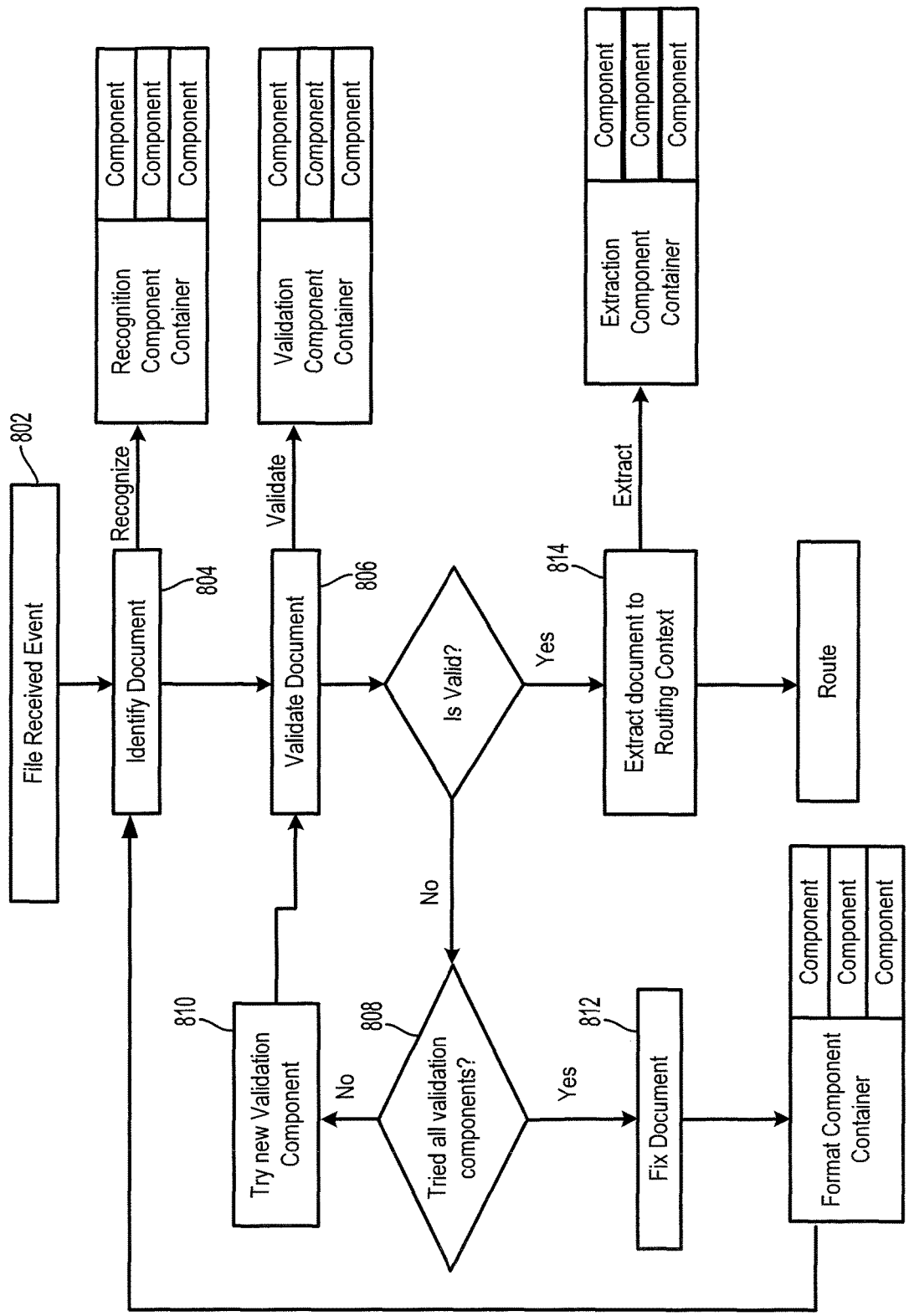
FIG. 8 illustrates the system, in accordance with various embodiments.

As illustrated in FIG. 8, the system includes a DREV (Document Recognition, Extraction and Validation) component to provide the ability to dynamically recognize the metadata about a document via its contents. The components responsible for the recognition can be injected into the system at runtime. A file is received (802). Once the document has been identified (804), the document is quickly scanned for all pertinent information, again dynamically configured at runtime, and this information is extracted into the routing context for further routing.

This event driven component also validates the document (806) for content and structure. If the document fails validation, the system initially attempts to find all applicable validation instructions (808) that would successfully validate the document and apply those instructions (810). If that fails, the system may attempt, again based on dynamic components, to format the document (812) so it passes validation. This validation methodology ensures the system can handle any type of document, regardless of the state of the document.

The secondary purpose of the DREV component is to do a full document extraction (814), taking all information from a document and storing it in a common model that pertains to the business concept. This extraction into the tracking context allows the document to be accessed by multiple applications, irrespective of the format the information initially came in as. This process can also be reversed, in effect creating any type of document from this tracking context.

Rules processing is triggered after the document is identified and information is extracted from the document. An event triggers the rules engines that orchestrate the execution of actions based on the sender followed by actions based on the receiver. The actions are capable of executing business logic including transformation of the document and routing the document to the proper outbound adapter for final delivery.

The business rules action can be engaged just like any other action within the rules engine. The purpose of the business rules engine is to validate, enrich and/or correct information in the business documents. The logic can be applied on a specific sender and/or on receiver.

The outbound engines host outbound adapters which can be introduced to the platform in a dynamic fashion. These adapters are referred to as senders since the purpose of them is to deliver the document to local or remote applications endpoints.

The visibility subsystem operates on the logical content of the business documents (aka line items). It tracks the status on the documents and correlates the information to the return documents. For example, logical information is tracked from the purchase orders and then correlates to the information from purchase order acknowledgements, advanced ship notice and correspondent invoice.

Production-Like Testing and Complex Business to Business Auditing System

The production-like testing and complex business to business auditing system includes a real-time verification feature that ensures that two production systems will yield the same or similar final business transaction, yet only one system is selected to process the business document. There may be millions of trading relations within an exchange, and a manual approach to migrate from an old system to a new system can create major disruptions in the trading community.

The system migrates the processing of documents from one system (typically an older platform/system being sunset) to the newer platform without causing disruption (or minimal disruption) to the clients and vendors. Without the system, the risk of misaligned orders may cause a major business disruption raging from ordering the wrong goods or completely missing the orders.

The logic is applied to the trading relation (e.g., sender, receiver, business document type, or business document subtype) to perform the verification. The system verifies (in real-time/live in production mode) that the software functionality as well as the trading relations configuration are functioning as expected. The system uses a configurable comparison algorithm to select the key elements to compare.

The feature allows the operator to control several key parameters, such as which elements of the business transaction to compare, the number of successful audits before considering the verification successful, and the desired action to trigger in response to the success criteria being satisfied. For example, the desired action may be to automatically move the processing to the system or alert the operator to use it manually.

Figure 9:
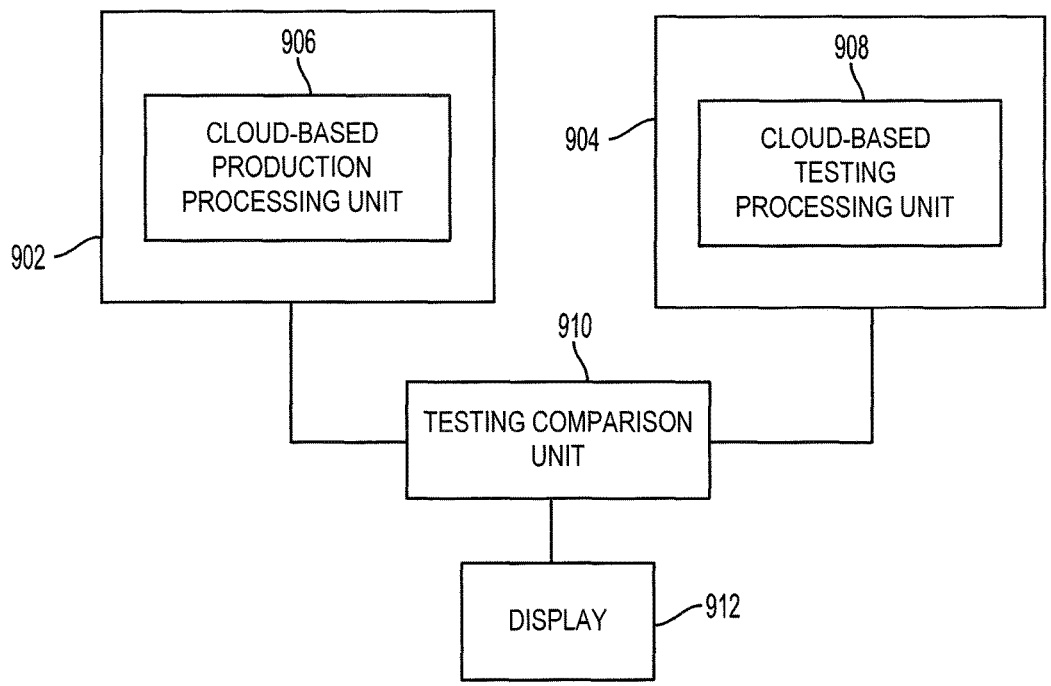
FIG. 9 illustrates a block diagram of the system, in accordance with various embodiments.

FIG. 9 illustrates a block diagram of the system. The system includes a cloud-based production environment 902 and a cloud-based testing environment 904. Within the cloud-based production environment 902 is a cloud-based production processing unit 906. Within the cloud-based testing environment 904 is a cloud-based testing processing unit 908. The cloud-based production environment 902 and the cloud-based testing environment 904 are in communication with a testing comparison unit 910, which is in communication with a display 912.

The system implements a scalable and efficient automated testing and quality assurance process for verifying a complex business to business platform. The system provides the ability to validate and ensure system stability between code releases, as well as cross-team efficiencies around updating partner configurations, new account creation and feature changes. This is achieved by allowing the user to run a diverse selection of real data in a regulated fashion on a parallel and controlled environment while capturing performance statistics for participating components and then doing historical comparisons of the output.

The system provides production-like replay testing, which has the capability of creating a set of millions of business documents from a production matching user defined criteria, provision a new parallel, controlled, isolated, on-demand and dispensable environment from scratch and execute the desired document set on it.

During the execution, various statistical information and metrics are gathered about the system cluster and its participating components to derive how the system is performing as a whole and by parts. This data can then be compared with previous runs to find the deviations from previous releases. The verification may include execution time, status, state, mapping, document body data, metadata, system and component level performance statistics. Results can be compared from release to release to identify trends and help make proactive counter measures. Results for a release may be stored in terms of snapshots for future reference or comparisons. This testing may assist in identifying bugs that affect even one out of the millions of event flows.

The system insulates the business from major incidents that can cause significant penalties as well as disruptions to the trading communities. The system migrates documents and verifies the accuracy of the information. In response to a new piece of software being released, where a particular document is stored and what functions may be applied to it may be unpredictable. Many permutations and combinations may be possible. The most secure way to verify the system is to retest with the same configuration as before and replay in the same order that the document came in, and compare and to see if any of the software changes that we made recently caused a drift in features or issues at all. The same production data is replayed. The final document is not communicated outside of the testing environment. Instead, it is contained within the testing environment.

Figure 10:
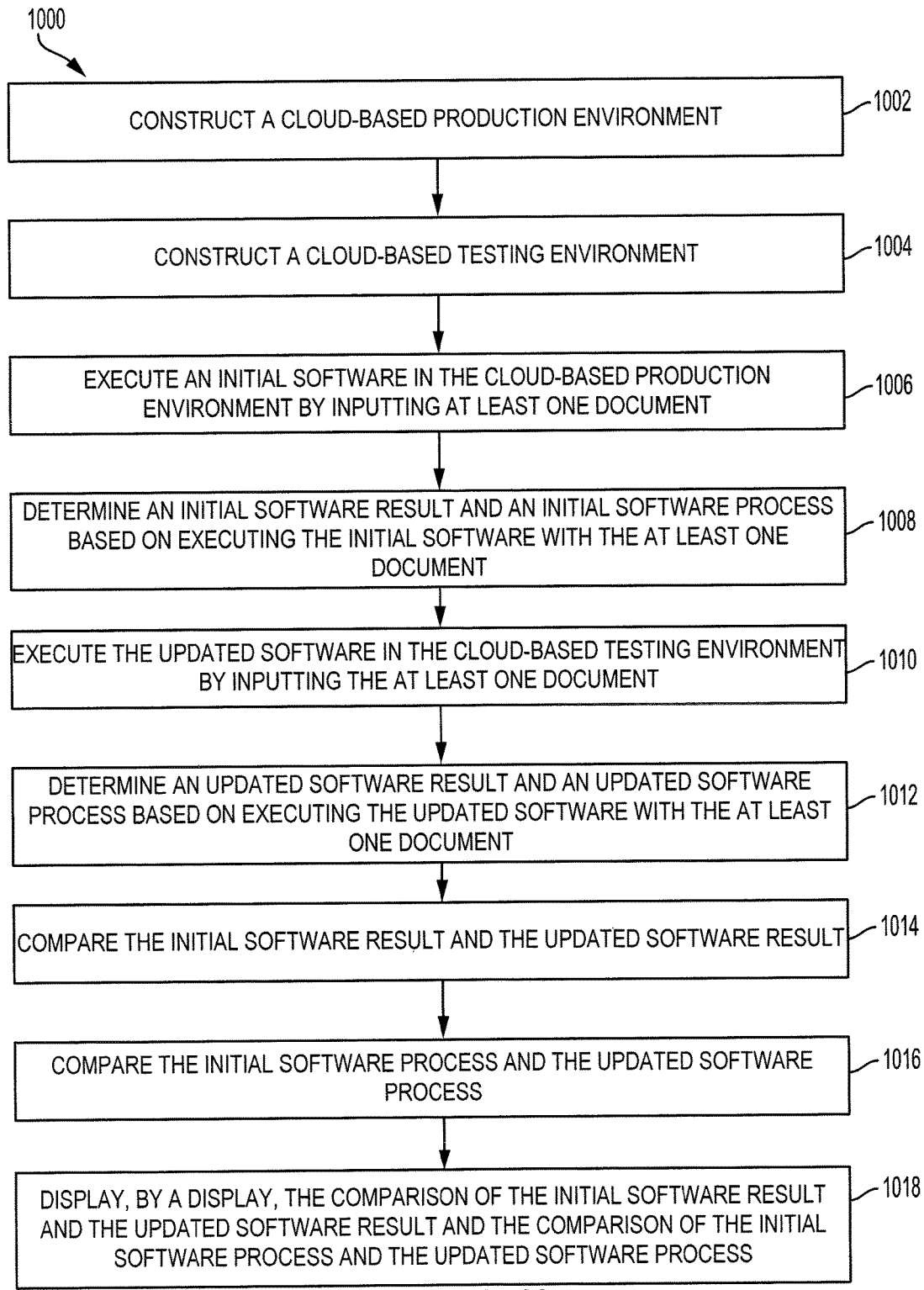
FIG. 10 illustrates a process of the production-like testing and complex business to business auditing system, in accordance with various embodiments.

FIG. 10 illustrates a process 1000 of the production-like testing and complex business to business auditing system. A cloud-based production environment 902 is constructed (step 1002) and a cloud-based testing environment 904 is constructed (step 1004). The cloud-based production environment 902 may be an already existing, currently functioning environment.

A document is input to the original software in the cloud-based production environment 902 (step 1006). The document is processed by the cloud-based production processing unit 906, executing the original software (step 1008). The document is input to the updated software in the cloud-based testing environment 904 (step 1010). The document is processed by the cloud-based testing processing unit 908, executing the updated software (step 1012).

The testing comparison unit 910 compares the initial software result and the updated software result (step 1014). The testing comparison unit 910 also compares the initial software process and the updated software process (step 1016). The respective software results may be the end product of the respective software, and the respective software processes may be the intermediate results and processes obtained and performed to reach the respective end product of the respective software. The original software trail and the updated software trail are compared.

The display 912 displays the comparison of the initial software result and the updated software result and the comparison of the initial software process and the updated software process (step 1018). In response to any of the compared aspects between the original software and the updated software not partially or fully matching, the system determines whether the mismatch is intended. In some situations, the mismatch may be intended, as the updated software has addressed an error or shortcoming in the original software. In response to the compared aspects between the original software and the updated software matching, and a match is intended, it is determined that the updated software is verified.

In various embodiments, the same exact production data is replayed, with all the variation that may occur. The user may selectively focus on purchase orders going from a particular client to a particular vendor. Thorough testing may be beneficial to avoid miscommunication and possible penalties therefrom.

Figure 11:
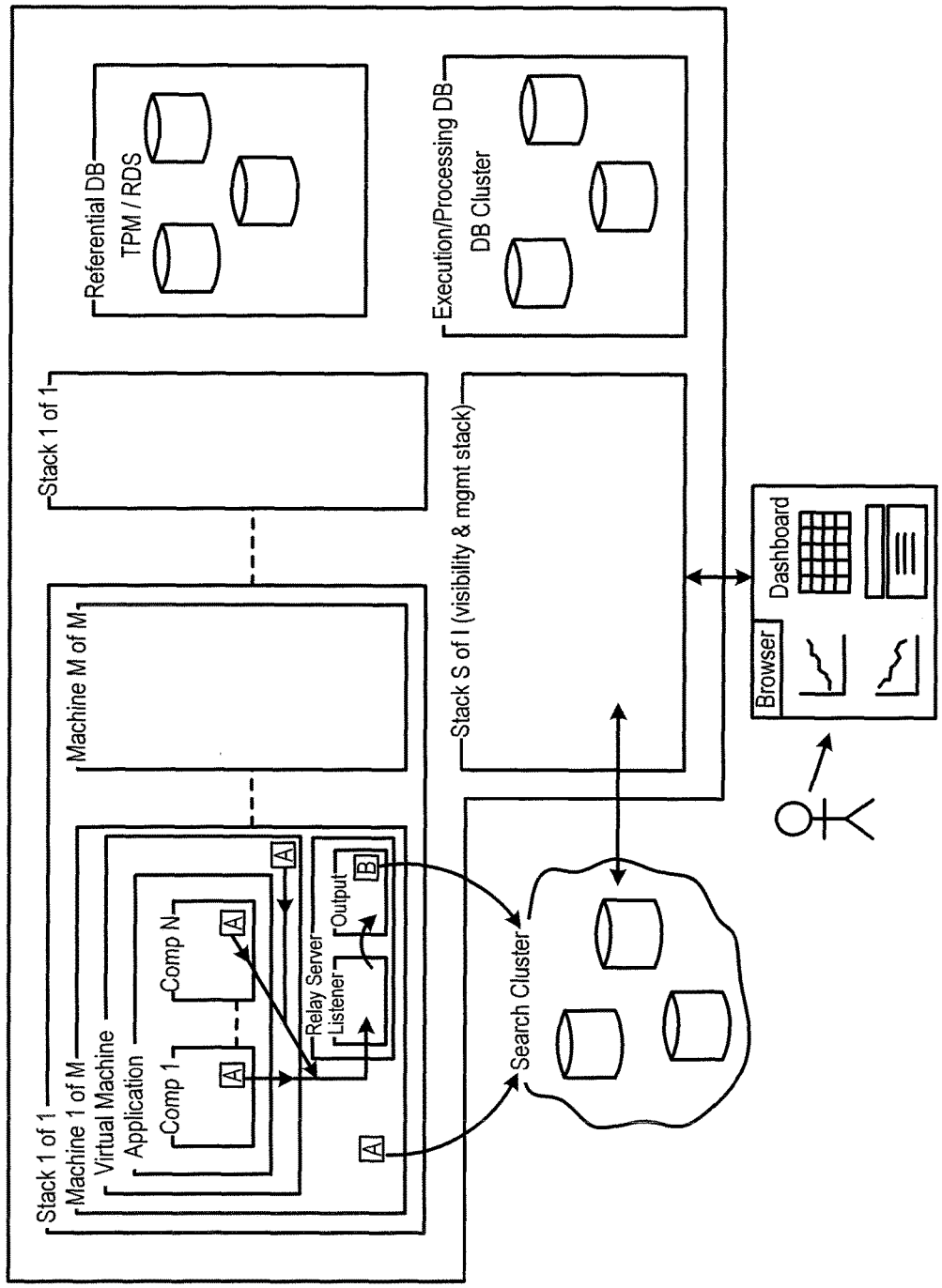
FIG. 11 illustrates the implementation of the system on a cloud-based environment, in accordance with various embodiments.
Figure 12:
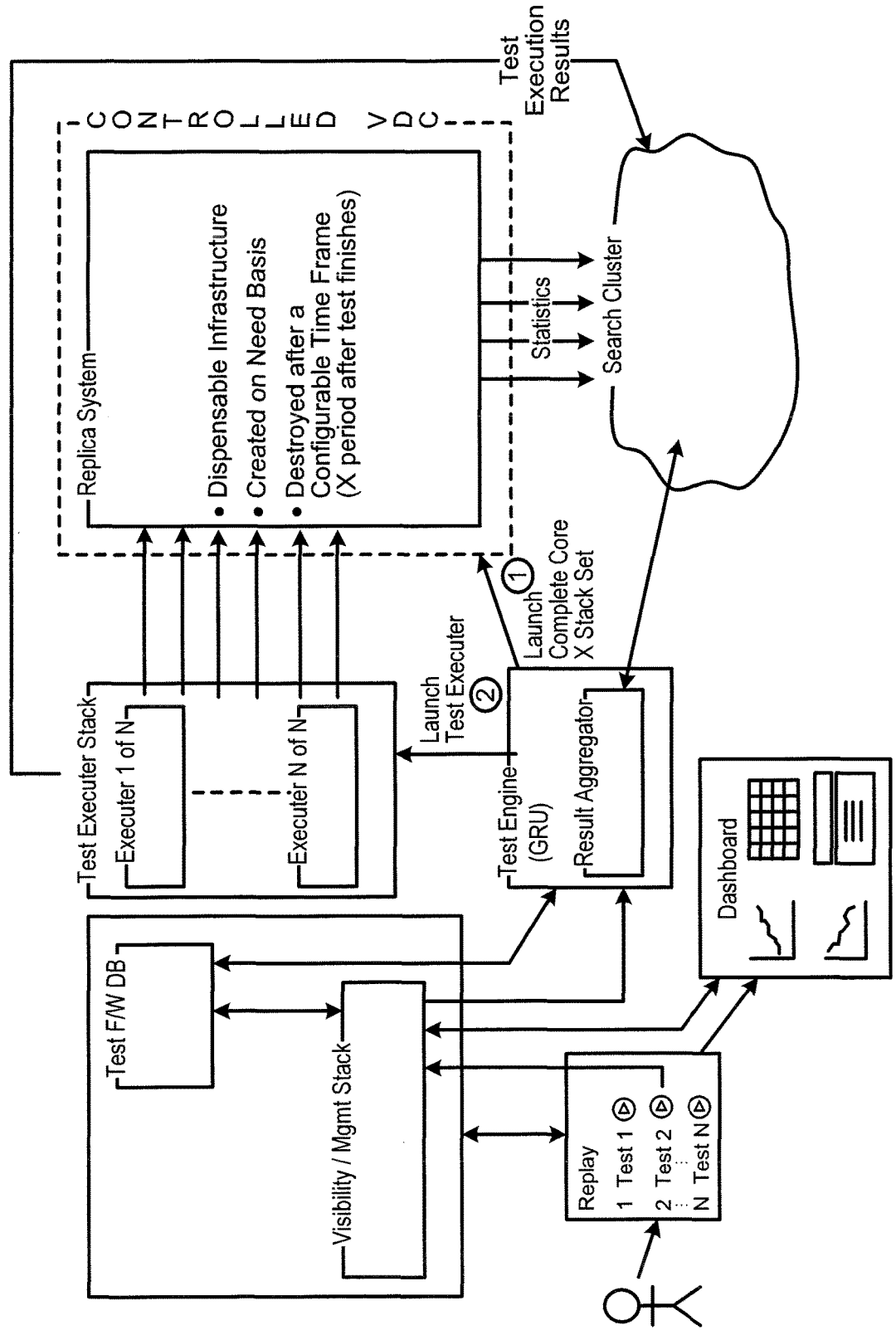
FIG. 12 illustrates the implementation of the system on a cloud-based environment, in accordance with various embodiments.

All of the processing is performed on the cloud, using cloud computing. FIGS. 11 and 12 illustrate the implementation of the system on a cloud-based environment. In order to have a valid test, the production environment is replicated. As the computing is performed on the cloud, in various embodiments, the system may not have any associated hardware. Everything is virtualized on the cloud. The system may first build out an entire production like environment in the cloud. The number of servers in production is replicated, and all of them are put on the cloud. Tasks are provisioned, and a production environment is created.

Production for one week or production for one day may be replayed, for example. What to replay may be selected and the system may replay, for example, the entire business process, including the purchase coming in, invoice out, advance ship notice, and purchase acknowledgement. An environment is provisioned on the cloud, dynamically. The environment is set up one machine at a time. The environment reaches production, pulls all of the metadata that triggers the replay, and performs the replay. Once the replay is done, it compares the result from the new testing environment to the result that is in production, and displays any discrepancies.

For example, for a particular document that was previously processed, the entire processing of the document and the triggered sub-systems may be replayed on the updated software. When the document is a purchase order, the events triggered by the receiving of the purchase order (e.g., verifying signature, decrypting the document, identifying formatting of the purchase order, enriching the purchase order) may also be seen and recorded. When the purchase order replay is complete, the results from the updated software are compared to the results from when the particular document was actually previously processed, to determine whether there are changes, and if so, whether the changes were intended.

There may be two kinds of databases, a configuration database and the runtime database. The configuration between the testing environment and the production environment must be identical. Therefore, the configuration is saved to the configuration database. Once the configuration is copied, the purchase order is obtained, the line items are fix up, the line items are aligned to the suppliers catalog to translate for different terms for each line item. Depending on the rules, the order may be split into multiple orders. Finally, it is sent it to the vendor using a specific protocol. However, as this is a test, instead of sending it to the endpoint of the vendor, it is sent to an internal mock-up application.

A graphical user interface dashboard may be provided that displays how many failures occurred, how many success occurred, and the user may further analyze the data to determine what failed and what did not.

Performing the testing on the cloud enables a significant cost savings. An entire testing environment may be provisioned and then destroyed, without having to purchase hardware for the test.

Conventionally, testing is done with use cases that may not include exactly what is in production. This may result in a test not setting up correctly and having the right data in the files. Instead, the system replays the production, but the end execution is not communicated to a vendor.

The system provides the ability to do a final verification in production and migrate in a controlled manner few relations at a time. The system also provides a rollback option which allows for a fast undo. The system is also capable of predicting system performance based on variation on load, introduction of a component, onboardings, and test migration strategies and their effects. The system provides the ability to replay an entire historical timeline from the production environment and verify that the business transactions remain consistent. The system also provides a way of identifying bottlenecks in the system, optimizing the quality of the system.

In some situations, in response to a system being merged with another system, a particular document may be processed in the first system and the second system. The system may provide for an audit flow to test the document in the first system and the second system. The flow may be governed by the sender, the receiver, the document type. The system allows the controlled consolidation from an old system to a new system.

Any of the systems described herein may communicate with a smartphone, the internet and/or social networking websites. Any communication, transmission and/or channel discussed herein may include any system or method for delivering content (e.g. data, information, metadata, etc), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise in response to of a merchant website, a social media website, affiliate or partner websites, an external vendor, a mobile device communication, social media network and/or location based service. Distribution channels may include in response to of a merchant website, a social media site, affiliate or partner websites, an external vendor, or a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, components, modules, and/or engines of the system may be implemented as microapplications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system may communicate with any network using any data communications protocol. As used herein, the term "network" includes any cloud, cloud computing system or electronic communications system or method which incorporates hardware and/or software components. Communication among the parties may be accomplished through any suitable communication channels using any communications protocol, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, Net-BIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE®ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

The system may also create, maintain and/or supplement a user profile. A "user profile" or "user profile data" may comprise any information or data about a consumer that describes an attribute associated with the consumer (e.g., a preference, an interest, demographic information, personally identifying information, and the like).

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage td occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "in response to of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

System program instructions and/or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   processing, by a computer-based system, a document by executing an initial software in a cloud-based production environment;
   determining, by the computer-based system, an initial software result and an initial software process based on executing the initial software with the document,
   wherein the initial software result is an end product of the initial software,
   wherein the initial software process includes the intermediate results and processes obtained and performed to reach an end product of the initial software;
   processing, by the computer-based system, the document by executing updated software in a cloud-based testing environment;
   determining, by the computer-based system, an updated software result and an updated software process based on executing the updated software with the document as part of a replay process;
   first comparing, by the computer-based system, the initial software result and the updated software result;
   second comparing, by the computer-based system, the initial software process and the updated software process;
   determining, by the computer-based system, that a mismatch of at least one of the first comparing or the second comparing is intended; and
   verifying, by the computer-based system, the updated software based on the determining.

2. The method of claim 1, wherein an event includes at least one of a state of the document, organizational change or system notification.

3. The method of claim 2, wherein the document comprises a plurality of documents associated with the client and the vendor.

4. The method of claim 3, wherein the plurality of documents associated with the client and the vendor are further associated with a time range.

5. The method of claim 1, wherein the document comprises a plurality of documents having a document type.

6. The method of claim 1, wherein a configuration of the cloud-based production environment is identical to a configuration of the cloud-based testing environment.

7. The method of claim 1, further comprising displaying, by the computer-based system, the comparison of the initial software result and the updated software result and the comparison of the initial software process and the updated software process.

8. The method of claim 1, wherein the document is a document being processed in a non-testing situation by an end user.

9. A system comprising:
   a processor; and
   a tangible, non-transitory memory configured to communicate with the processor,
   the tangible, non-transitory memory having instructions stored thereon that, in response to execution by the processor, cause the processor to perform operations comprising:
   processing, by the processor, a document by executing an initial software in a cloud-based production environment;
   determining, by the processor, an initial software result and an initial software process based on executing the initial software with the document,
   wherein the initial software result is an end product of the initial software,
   wherein the initial software process includes the intermediate results and processes obtained and performed to reach an end product of the initial software;
   processing, by the processor, the document by executing updated software in a cloud-based testing environment;
   determining, by the processor, an updated software result and an updated software process based on executing the updated software with the document as part of a replay process;
   first comparing, by the processor, the initial software result and the updated software result;
   second comparing, by the processor, the initial software process and the updated software process;
   determining, by the processor, that a mismatch of at least one of the first comparing or the second comparing is intended; and verifying, by the processor, the updated software based on the determining.

10. The system of claim 9, wherein the document is associated with a client and a vendor.

11. The system of claim 10, wherein the document comprises a plurality of documents associated with the client and the vendor.

12. The system of claim 11, wherein the plurality of documents associated with the client and the vendor are further associated with a time range.

13. The system of claim 9, wherein the document comprises a plurality of documents having a document type.

14. The system of claim 9, wherein a configuration of the cloud-based production environment is identical to a configuration of the cloud-based testing environment.

15. The system of claim 9, further comprising a display configured to display the comparison of the initial software result and the updated software result and the comparison of the initial software process and the updated software process.

16. The system of claim 9, wherein the document is a document being processed in a non-testing situation by an end user.

17. An article of manufacture including a non-transitory, tangible computer readable storage medium having instructions stored thereon that, in response to execution by a computer-based system, cause the computer-based system to perform operations comprising:
   processing, by the computer-based system, a document by executing an initial software in a cloud-based production environment;
   determining, by the computer-based system, an initial software result and an initial software process based on executing the initial software with the document, wherein the initial software result is an end product of the initial software,
   wherein the initial software process includes the intermediate results and processes obtained and performed to reach an end product of the initial software;
   processing, by the computer-based system, the document by executing the updated software in a cloud-based testing environment;
   determining, by the computer-based system, an updated software result and an updated software process based on executing the updated software with the document as part of a replay process;
   first comparing, by the computer-based system, the initial software result and the updated software result;
   second comparing, by the computer-based system, the initial software process and the updated software process;
   determining, by the computer-based system, that a mismatch of at least one of the first comparing or the second comparing is intended; and
   verifying, by the computer-based system, the updated software based on the determining.

18. The cloud-based testing system of claim 17, wherein the document is associated with a client and a vendor.

19. The cloud-based testing system of claim 18, wherein the document comprises a plurality of documents associated with the client and the vendor.

20. The cloud-based testing system of claim 19, wherein the plurality of documents associated with the client and the vendor are further associated with a time range.

* * * * *

UNITED STATES PATENT AND TRADEMARK OFFICE
CERTIFICATE OF CORRECTION

| | |
|---|---|
| PATENT NO. | : 10,083,112 B2 |
| APPLICATION NO. | : 15/377843 |
| DATED | : September 25, 2018 |
| INVENTOR(S) | : Steve Cochran et al. |

It is certified that error appears in the above-identified patent and that said Letters Patent is hereby corrected as shown below:

In Column 22, Line 24 in Claim 18, please delete "The cloud-based testing system" and insert -- The article of manufacture --

In Column 22, Line 26 in Claim 19, please delete "The cloud-based testing system" and insert -- The article of manufacture --

In Column 22, Line 29 in Claim 20, please delete "The cloud-based testing system" and insert -- The article of manufacture --

Signed and Sealed this
Fifth Day of November, 2019

Andrei Iancu
*Director of the United States Patent and Trademark Office*